UNITED STATES PATENT OFFICE.

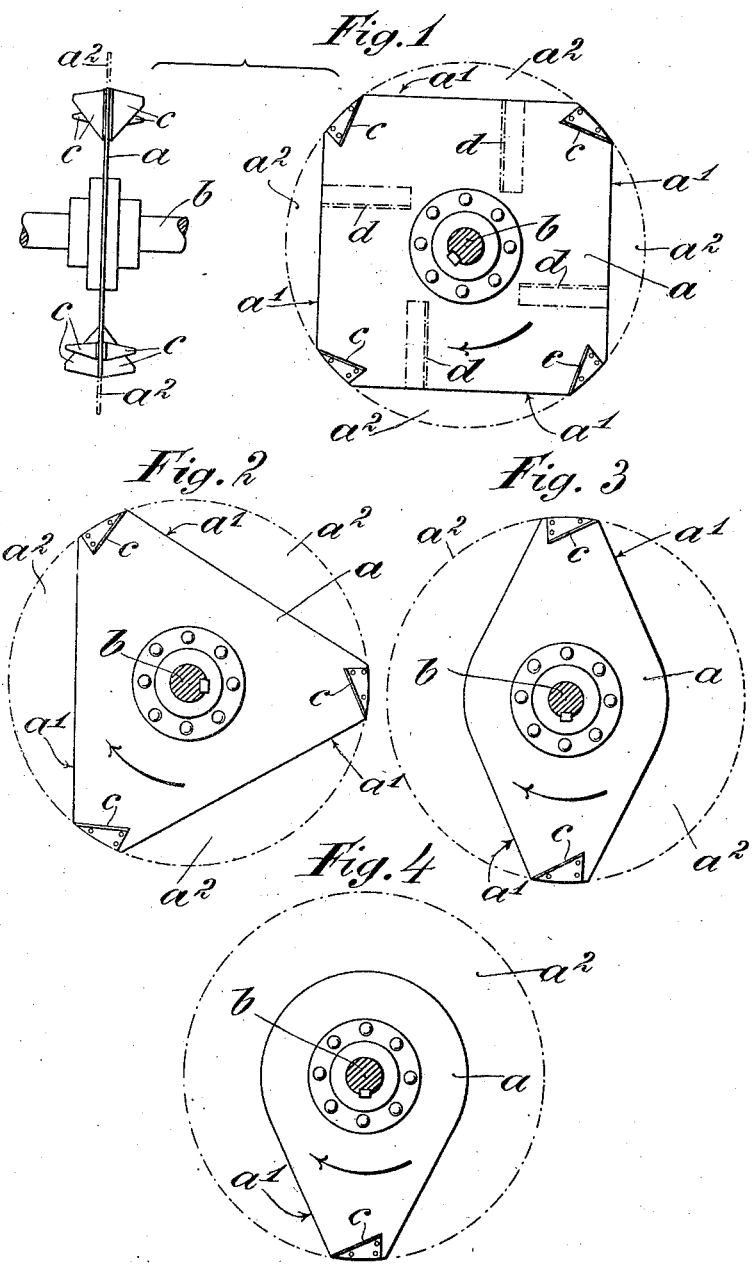

KARL KÖSZEGI, OF BAJA, AND EMIL SZÉCHENYI, OF VAJSZKA, AUSTRIA-HUNGARY.

CULTIVATING-MACHINE.

1,034,124. Specification of Letters Patent. Patented July 30, 1912.

Application filed July 31, 1909. Serial No. 510,610.

*To all whom it may concern:*

Be it known that we, KARL KÖSZEGI and EMIL SZÉCHENYI, subjects of the King of Hungary, and residents of Baja, Austria-Hungary, and Vajszka, Bács-Bodrog-megye, Austria-Hungary, respectively, have invented a certain new and useful Improvement in Cultivating-Machines, of which the following is a specification.

This invention relates to improvements in cultivating implements of the kind described in our United States Patent No. 941422, and has for its object an improved construction of such implement whereby a furrow of uniform depth is obtained under all circumstances. According to the invention, this is obtained by cutting away segments, from the scoring disks carrying the hoes, between every two sets of hoes, a scoring edge being thereby formed on the disk in front of each set of hoes, this edge cutting through and breaking up any obstacles.

The accompanying drawing illustrating the invention shows several embodiments of the improved cultivating implement.

Figure 1 shows the construction of an implement of the kind described provided with four hoes on each side while Figs. 2, 3 and 4 show the construction of an implement with three hoes, two hoes and one hoe on each side respectively. In the same manner disks with more than four sets of hoes may be used.

Referring to the drawings, $a$ are the scoring disks which are rotated at a high speed in the direction of the arrow. At the circumference of the disk, small angle irons are secured consisting of a flat part placed flat against the disk and secured thereto by rivets $c'$, and a triangular cutting part forming the hoes $c$ placed perpendicular to said flat part and the disk and at an angle to the radius of the disk. One apex of each hoe is placed at the rear end (relative to the rotation of the disk) of each scoring or cutting edge $a'$, which edges are formed by the removal of segments $a^2$ (shown dotted) between every two sets of hoes $c$.

The *modus operandi* of the implement will be easily understood. The disk $a$ provided with hoes $c$ acts in the same manner as described in our above mentioned specification but does not rise over hard obstacles and instead of this cuts through them or breaks them up in front of each hoe, the disk thus cutting through each obstacle to the same depth and leaving no unplowed places.

As is evident the blades $d$ described in the above mentioned specification will be in most cases superfluous but may be useful for certain forms of implements and under certain conditions.

Having described our invention what we claim and desire to secure by Letters Patent of the United States is:—

An implement for agricultural cultivators, comprising a cutting disk having segments thereof cut away to form straight cutting edges, and hoes consisting of symmetrically arranged halves carried on opposite sides of the disk, each of said halves consisting of a flat part placed flat against the disk, and a triangular cutting part perpendicular to said flat part, at an angle to the radius of the disk, the forward apex of each half being disposed coincident with the rear end of said cutting edge, the free edge of said flat part being arcuate and disposed outwardly flush with the outermost edge of the disk and forming therewith a strengthened cultivating edge.

In testimony whereof we have signed our names to this specification in the presence of two subscribing witnesses.

KARL KÖSZEGI.
EMIL SZÉCHENYI.

Witnesses:
MARTIN HOEMGER,
ELWOOD AUSTRI WELDEN.